March 23, 1926.  
S. R. FOOT  
1,577,799  
COMBINED MERCHANDISE INDICATOR AND HOUSEHOLD ACCOUNT DEVICE  
Filed Dec. 8, 1924  2 Sheets-Sheet 2
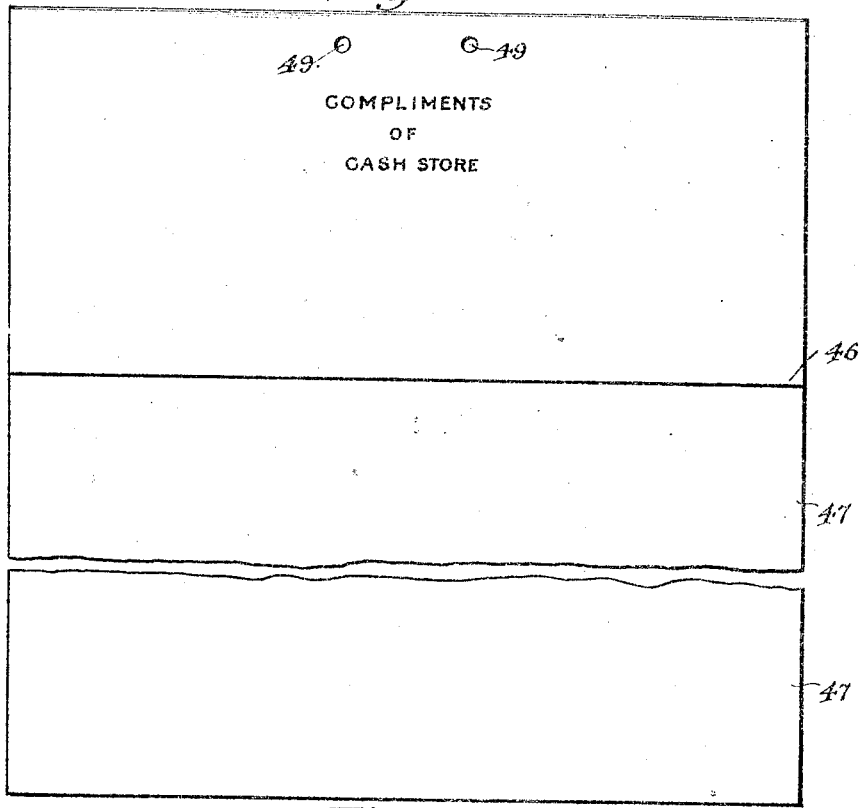
INVENTOR.  
Stanley R. Foot,  
BY  
Geo. P. Kimmel ATTORNEY.

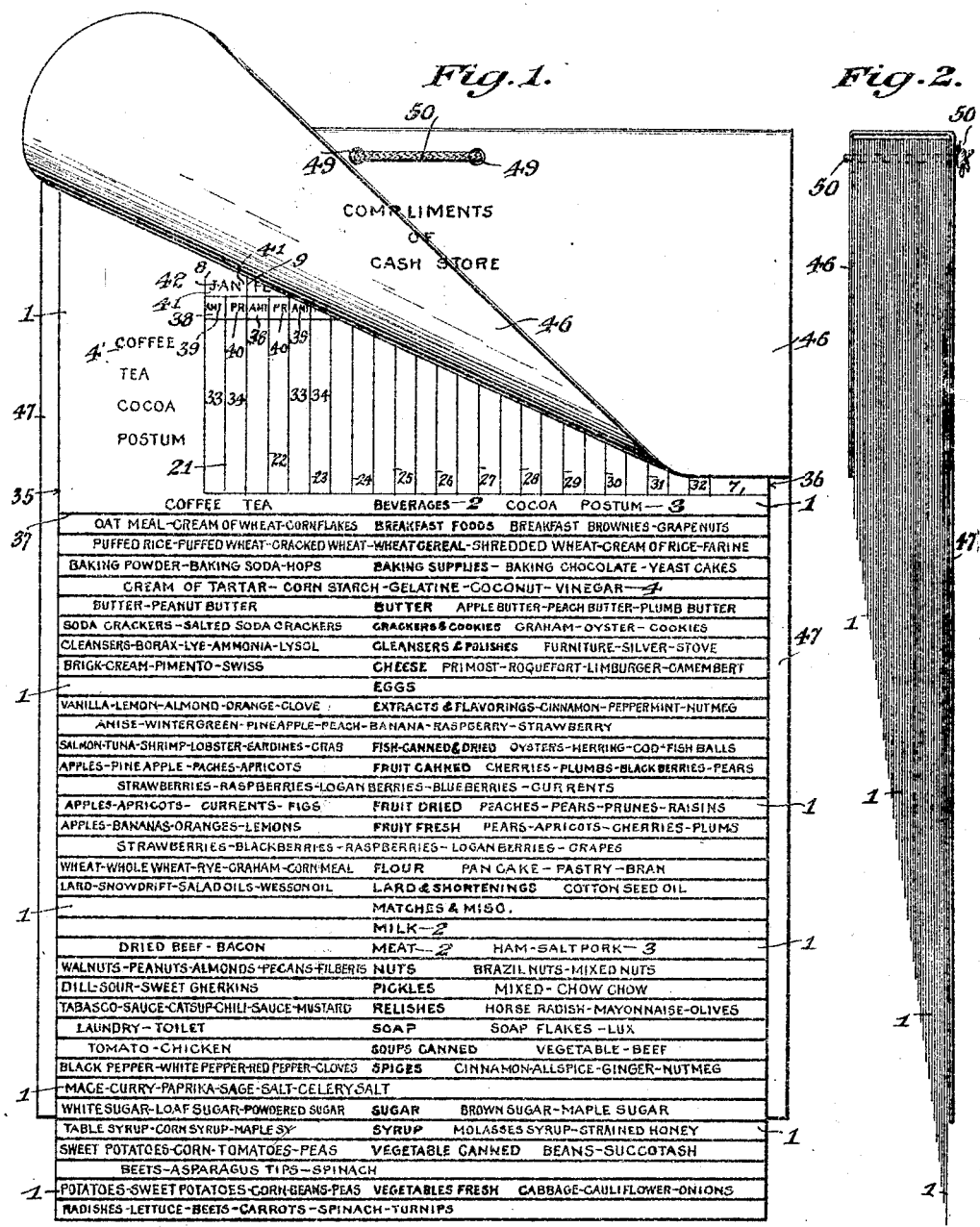

Patented Mar. 23, 1926.

1,577,799

UNITED STATES PATENT OFFICE.

STANLEY R. FOOT, OF CHOTEAU, MONTANA.

COMBINED MERCHANDISE INDICATOR AND HOUSEHOLD-ACCOUNT DEVICE.

Application filed December 8, 1924. Serial No. 754,602.

*To all whom it may concern:*

Be it known that I, STANLEY R. FOOT, a citizen of the United States, residing at Choteau, in the county of Teton and State of Montana, have invented certain new and useful Improvements in Combined Merchandise Indicator and Household-Account Devices, of which the following is a specification.

This invention relates to a combined merchandise indicator and household account device, more particularly to a visible grocery catalog combined with means for recording grocery accounts for the house wife, and the invention has for its object to provide, in a manner as hereinafter set forth, the device with means to constitute a merchandise indicator, and further with means for recording grocery accounts for the house wife for a predetermined period.

A further object of the invention is to provide, in a manner as hereinafter set forth, a combined merchandise indicator and household account device, with means for increasing the house wife's grocery vocabulary.

A further object of the invention is to provide, in a manner as hereinafter set forth, a combined merchandise indicator and household account device, not only having means to provide a visible grocery catalog, but further having means for recording the amount and cost of an article of merchandise purchased during fractional parts of a year, and including means whereby the aggregate purchases of any particular article for a predetermined period can be readily ascertained.

Further objects of the invention are to provide, in a manner as hereinafter set forth, a combined merchandise indicator and household account device, which is simple in its construction and arrangement, durable, compact, thoroughly efficient and convenient in its use, readily assembled, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a front elevation of a combined merchandise indicator and household account device, in accordance with this invention.

Figure 2 is a view looking towards one side thereof.

Figure 3 is a front elevation, broken away, of the cover.

Figure 4 is a front view of one of the combined merchandise indicating and household accounting sheets.

A device in accordance with this invention is designed for use primarily as a visible grocery catalog and as a means for keeping grocery accounts for the house wife, and comprises a series of combined merchandise indicating and household accounting sheets, indicated generally by the reference character 1, and arranged in superposed relation and with each inner sheet of greater length than an outer sheet, so that said inner sheets will project at their lower ends from the outer sheets.

Each of said sheets, at the lower portion thereof, on its outer face, preferably centrally, is provided with means, as at 2, to indicate the class of merchandise with which the sheet is connected, and when such class of merchandise includes several different articles, the sheet is further provided with means, as at 3, to indicate the names of such articles. If the lower portion of a sheet is not of a width to contain all the names of the articles under a class, then the names of said articles are continued on an inner sheet, as indicated at 4. In this connection with reference to the class of baking supplies or fresh fruits and spices, it requires two of the sheets 1 to carry the names of the several articles under each of said classes.

Each of the sheets 1, above the class indicating means and article indicating means 2, 3 respectively, is provided with a column of indications, as at 4′, which correspond to the article indications 3, and the sheet is furthermore provided with longitudinally extending lines 5, 6 and 7, and a series of spaced transversely extending lines 8, 9, 10, 11, 12, 13, 14, 15, 16, 17, 18, 19 and 20. The sheet is also provided with a series of transversely extending lines 21, 22, 23, 24, 25, 26, 27, 28, 29, 30, 31 and 32, which are of less length than the lines 8 to 20 both inclusive.

The lines 21 to 32 are alternately disposed with respect to the lines 8 to 20, both inclusive, and form what may be termed amount columns 33 and price or cost columns 34. The price columns 34 are alternately disposed with respect to the amount columns 33.

The line 8 is arranged between the transverse center and one side edge 35 of the sheet 1, and the lines 5, 6 and 7 extend from the line 8 to the other side edge 36 of the sheet 1. The line 7 is positioned at a point a substantial distance from the bottom edge 37 of the sheet 1, and between the line 7 and said edge is arranged the indications 2 and 3.

The lines 8 to 20 extend from the line 7 and through the lines 5 and 6, and said lines 8 to 20 extend a substantial distance above the line 5. The lines 21 to 32, both inclusive, extend from the line 7, through the line 6 and to the line 5 and are of less length than the lines 8 to 20.

The lines 5 and 6 in connection with the lines 8 to 32 inclusive provide a longitudinally extending row of spaces 38 provided with designations which associate with the columns 33 and 34. The designations which associate with the columns 33 are indicated at 39 and consist of the abbreviation of the word "Amount", and the designations which associate with the columns 34 are indicated at 40 and consist of the abbreviation of the word "Price". The indications 40 are alternately disposed with respect to the indications 39, and said indications 39 and 40 are arranged at the top of the columns 33 and 34 respectively.

The line 5, in connection with the upper ends of the lines 8 to 20, forms a longitudinally extending row of spaces 41, and each of said spaces 41 is arranged over a pair of spaces 38. Twelve spaces 41 are provided and each of which has arranged therein an abbreviation, as at 42, to indicate a month of the year.

The line 20, in connection with the end edge 36, forms a total column 43, having at the top thereof a designation 44, which is arranged within a space 45 formed by the lines 5, 6 and 20.

Within the column 33 is adapted to be recorded the amount of an article purchased and within the column 34 the price or cost of such article. The arrangement is such that the house wife can keep an account monthly of the amount of each article purchased, as well as the price of the same and the total for the year, as to the amount of the article purchased as well as the cost of the same can be recorded in the column 43.

A cover is constructed of any suitable flexible material and bent to provide a front fold 46 and a rear fold 47. The front fold 46 conceals the major portion of the outer sheet 1, and the fold 47 provides a back for the inner sheet 1. The sheets are formed with openings 48, and the folds with openings 49, and the openings in the sheets align with each other and also align with the openings in the folds, and extending through the aligning openings is a flexible securing device 50.

The indications or inscriptions 2, 3, provide a complete catalog of the articles of merchandise that can be purchased from a grocery and increase what may be termed the house wife's grocery vocabulary, and the house wife can readily ascertain by reference to the indications 2 a certain class of merchandise, and can also ascertain by reference to the indications 3 the various articles which come under such class. As before stated, each sheet 1 can be employed to keep an account of the amount, as well as the cost of an article for a predetermined period, as shown for a period of a year, and furthermore the house wife can ascertain the various articles purchased and the cost of the same for each month of the year.

It is thought that the many advantages of a combined merchandise indicator and household account device, in accordance with this invention can be readily understood, and although the preferred embodiment of the invention is as illustrated and described, yet changes in the details of construction can be had which will be within the scope of the invention as claimed.

What I claim is:—

1. A combined merchandise indicator and household account device comprising a series of superposed combined merchandise indicating and recording sheets, each of the inner sheets projecting below the lower edge of an outer sheet, means on the outer face at the lower portion of each sheet for visually indicating the name of the general class of merchandise with which the sheet is associated, means on the outer face of each of said sheets to provide a group of appropriately designated pairs of spaces, the spaces of each pair associating with each other and for independently recording the amount and cost respectively of the merchandise purchased of that class with which the sheet is associated for a predetermined period different from that of an adjacent pair, and means for connecting the sheets together at their upper ends.

2. A combined merchandise indicator and household account device comprising a series of superposed combined merchandise indicating and recording sheets, each of the inner sheets projecting below the lower edge of an outer sheet, means on the outer face at the lower portion of each sheet for visually indicating the name of the general class of merchandise with which the sheet is associated, means on the outer face of certain of said sheets at the lower portion thereof to visibly indicate the names of the articles of merchandise belonging to the class of merchandise with which the sheet is associated, means on the outer face of each of said sheets to provide a group of appropriately designated pairs of spaces, the spaces of each pair associating with each other and for independently recording the amount and cost respectively of the merchandise purchased of that class with which the sheet is associated for a predetermined period different from that of an adjacent pair, and means for connecting the sheets together at their upper ends.

3. A combined merchandise indicator and household account device comprising a series of superposed combined merchandise indicating and record sheets, each of the inner sheets projecting below the lower edge of an outer sheet, means on the outer face at the lower portion of each sheet for visibly indicating the name of the general class of merchandise with which the sheet is associated, means on the outer face of certain of said sheets at the lower portion thereof to visibly indicate the names of the articles of merchandise belonging to the class of merchandise with which the sheet is associated, means on the outer face of each of said sheets to provide a group of appropriately designated pairs of spaces, the spaces of each pair associating and for independently recording the amount and cost respectively of the merchandise purchased of that class with which the sheet is associated for a predetermined period, the means for visibly indicating the general class of merchandise being more distinctive than the means for visibly indicating the names of the articles belonging to such class, and means for connecting the sheets together at their upper ends.

In testimony whereof, I affix my signature hereto.

STANLEY R. FOOT.